United States Patent
Sundaram et al.

(10) Patent No.: US 9,135,364 B1
(45) Date of Patent: Sep. 15, 2015

(54) DELIVERY OF WEB PAGES WITH MARKUP FOR SPEED

(71) Applicant: Google Inc., Mountain View, CA (US)

(72) Inventors: Sridhar Sundaram, Bangalore (IN); Ramkumar Ramani, San Jose, CA (US); Rahul Bansal, Punjab (IN)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/673,242

(22) Filed: Nov. 9, 2012

Related U.S. Application Data (60) Provisional application No. 61/558,306, filed on Nov. 10, 2011.

(51) Int. Cl.
*G06F 15/16* (2006.01)
*G06F 17/30* (2006.01)
*H04L 29/08* (2006.01)

(52) U.S. Cl.
CPC .... *G06F 17/30899* (2013.01); *G06F 17/30902* (2013.01); *H04L 67/02* (2013.01)

(58) Field of Classification Search
CPC ............... G06F 17/30899; G06F 17/30902
USPC .......... 707/E17; 709/201, 203, 217, 223, 224
See application file for complete search history.

(56) References Cited

U.S. PATENT DOCUMENTS

| | | | |
|---|---|---|---|
| 5,835,712 A | 11/1998 | DuFresne | |
| 5,905,981 A | 5/1999 | Lawler | |
| 5,940,834 A | 8/1999 | Pinard et al. | |
| 6,061,698 A | 5/2000 | Chadha et al. | |
| 7,454,434 B1 * | 11/2008 | Cohen et al. | 1/1 |
| 7,523,158 B1 * | 4/2009 | Nickerson et al. | 709/203 |
| 7,565,359 B2 | 7/2009 | Nazem et al. | |
| 7,689,899 B2 | 3/2010 | Leymaster et al. | |
| 7,827,075 B2 | 11/2010 | Hess et al. | |
| 8,126,901 B2 | 2/2012 | Shan et al. | |
| 8,762,938 B2 * | 6/2014 | Calvin | 717/108 |
| 2010/0095197 A1 * | 4/2010 | Klevenz et al. | 715/234 |
| 2011/0060727 A1 * | 3/2011 | Koul et al. | 707/689 |
| 2011/0060788 A1 * | 3/2011 | Haybi et al. | 709/203 |
| 2011/0208812 A1 * | 8/2011 | Bimson et al. | 709/203 |
| 2012/0284290 A1 * | 11/2012 | Keebler et al. | 707/756 |
| 2013/0041946 A1 * | 2/2013 | Joel et al. | 709/203 |

* cited by examiner

*Primary Examiner* — Mohamed Wasel
*Assistant Examiner* — Rachel J Hackenberg
(74) *Attorney, Agent, or Firm* — Fish & Richardson P.C.

(57) ABSTRACT

A web page delivery method and system uses speed-up parameters such as retrieval hints, cache time parameters and criticality hints to improve delivery of web pages. It may be operated by a web server, an edge server, and/or a client device. A first server receives a request to deliver the web page and determines that page includes static content elements, variable content elements, and a speed-up parameter. The first server serves the web page. It also uses the speed-up parameter to retrieve updated data corresponding to the variable content element from a second server. The first server serves the web page with the updated data corresponding to the variable content element without updating the static content elements.

17 Claims, 6 Drawing Sheets

DELIVERY OF WEB PAGES WITH MARKUP FOR SPEED

RELATED APPLICATIONS AND CLAIM OF PRIORITY

This patent application claims priority to U.S. provisional patent application No. 61/558,306, filed Nov. 10, 2011, the disclosure of which is hereby incorporated by reference in its entirety.

BACKGROUND

Access to World Wide Web (WWW)-based content can never be too fast. As technologies for content delivery improve and allow fast delivery of content over a base network at a base quality, developers and users turn to more mobile devices on slower networks, to higher quality content that demands more bandwidth, and to greater volumes of data in response to a single user request.

The technology disclosed in this document relates to methods of enhancing delivery of web pages. In particular, this document discloses methods that may help to yield delivery speed improvements of web pages.

SUMMARY

The technology disclosed uses speed-up parameters such as retrieval hints, cache time parameters and criticality hints to improve delivery of web pages. It may be operated by a web server, an edge server, and/or a client device. If so, it may use the retrieval hint to identify at least one static content element and at least one variable content element for the web page. The first server also may determine that a speed-up parameter is available. The first server may serve the web page so that the web page comprises the static content elements and the variable content element. The system may then receive a request to update the web page. If it determines that a speed-up parameter is available, the first server may use the speed-up parameter to retrieve updated data corresponding to the variable content element from a second server. The first server may serve the web page with the updated data corresponding to the variable content element without updating the static content elements.

Optionally, the speed-up parameter may include a cache time parameter. If so, the first server may determine whether a period corresponding to the cache time parameter has expired. The period may be required to be expired in order to retrieve the updated data from the second server if the period has expired. Otherwise, the server may retrieve the updated data from a local cache.

Optionally, the speed-up parameter may include a criticality hint having a numeric value. If so, when serving the web page, the system may initially retrieve only a number of variable content elements that corresponds to the numeric value. It may initially serve the web page with the initially retrieved variable content elements, and then retrieve the remaining variable content elements. It will then subsequently serve the web page with both by the initially retrieved elements and the subsequently retrieved elements.

In another embodiment where the speed-up parameter includes a criticality hint having a numeric value, when serving the web page the system serves a number of the variable content elements that corresponds to the numeric value of the criticality hint before retrieving updated data from the second server for any more of the additional variable content elements.

In some embodiments, before the determining, the first server may store the speed-up parameter in a look-up table by the first server. If so, the determining step may include accessing the look-up table to retrieve the speed-up parameter.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to."

This document describes new technologies for data delivery via data communications systems such as the Internet, an intranet or a mobile communications network. The methods involve the delivery of documents or data resources that are suitable for the World Wide Web, so that the delivery occurs to a browser for display to a user. In this patent application, such a document or data resource may be referred to as a "web page." Web pages are served in the form of code that may be read and executed by the browser, such as HTML or, XML. Web pages may include information that is displayed, such as images and/or image files, media files, hyperlinks for interaction between pages, and other content. Web pages also may include hidden information such as comments, metadata, scripts or links that are used to access offline media files.

Figure 1:
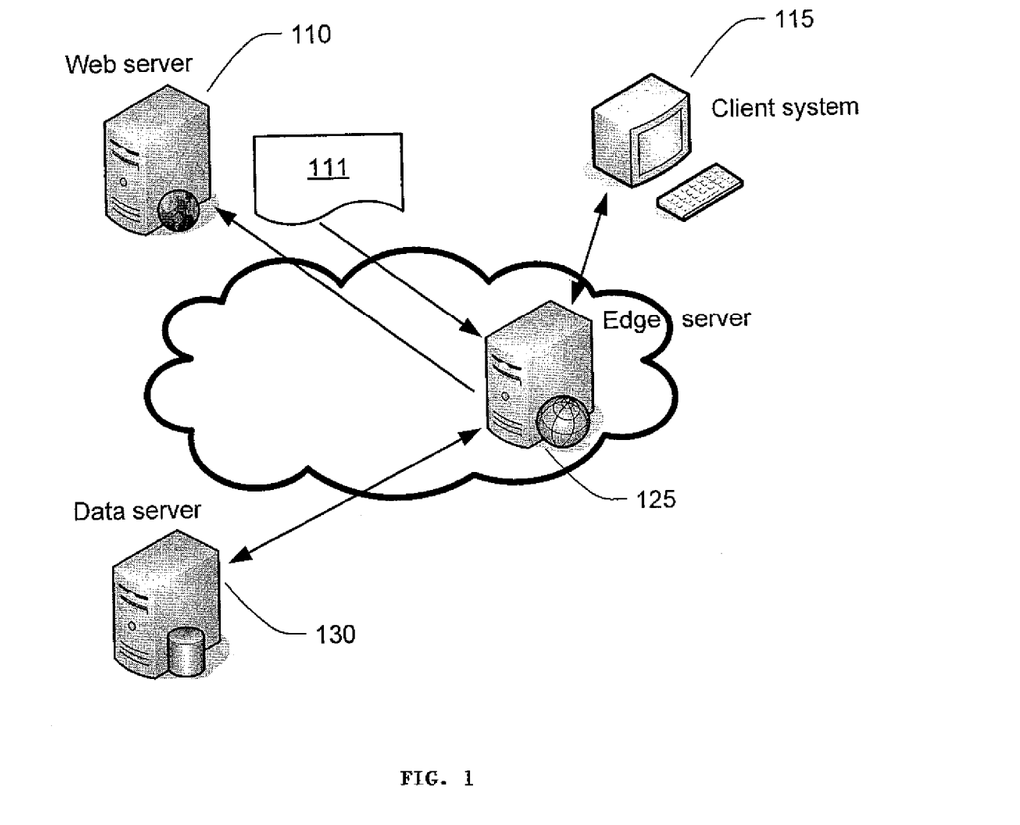
FIG. 1 is an example of various elements of a computing environment in which the methods and systems disclosed in this document may be used.

FIG. 1 is an example of an environment in which web pages may be served. A client system 115 requests and renders web pages. A request goes via a network such as the Internet to a web server 110, which returns a web page 111. The request may pass through a content delivery network, including an edge server 125. An edge server 125 is a network appliance including a processor and memory that stores data for access by multiple local network clients in order to reduce latency, as compared to what the clients would experience if all client requests were sent out for processing by the external web server. The edge server 125 may receive the request and pass it to the data server 130. The data server 130 returns the requested data. In some web pages, a technology known as AJAX is implemented, which leaves open a channel from the client system to the data server for repeated data requests. This AJAX technology requires relatively sophisticated programming.

Common to content delivery networks (CDNs) is a strategy of web caching of either the most commonly requested content or sponsored content from web sites that pay to reduce latency experienced by their clients. In the prior art, the entire web page may be cached in the edge server 125.

In the present systems and methods, some of the content of a web page may be static, meaning that it may be retrieved from an external server, stored in a local cache, and not retrieved again from the external server the next time that a request to serve or update the web page is processed. For example, a web page for a news company's website may include a logo, menu bar, headings for various content categories, and feature articles or advertisements that are intended to remain available on the page for a longer period of time. Static content for a social networking site page may include the user's name, photo, and profile data. Static content also may include templates, headers and other structures that appear on the page each time that it is retrieved. Static information may remain static, without the need for updating, through a number of update requests and/or for a period of time that is longer than that of variable content information, discussed below.

Other content of a web page may be non-static, meaning that it must be retrieved from a server more frequently, such as each time that a request to serve or update the web page is processed. Alternatively, non-static elements may be updated only if the content's cache time parameter has not been exceeded. (Cache time parameters will be discussed below.) In each case, non-static web page content elements may be referred to in this document as "variable content elements" or simply "variable elements." Using the example of a news company's website, examples of variable content elements may include breaking news, top stories, weather data, stock quotes, and sports scores. In a social networking site, variable content elements may include, for example, content that makes up a news feed, a list of friends who are online, a list of trending discussion topics, and other frequently-changing information.

In the embodiments described below, hidden information in a web page may include one or more speed-up parameters. A speed-up parameter is metadata, script, comments or hidden code that corresponds to one or more variable content elements and which can help reduce latency in retrieval of the web page by specifying information or instructions relating to which portions of a page should be updated on every requests. Speed-up parameters may include (i) cache time parameters, (ii) retrieval hints and (iii) criticality hints, each of which will be discussed in more detail below.

A retrieval hint is a speed-up parameter that identifies either one or more variable elements of the web page or one or more static elements of the web page. The system may use all of the retrieval hints for a page to determine which content items are static and which content items are variable.

A cache time parameter is a speed-up parameter that identifies a length of time that a particular variable content element should remain on a page before it needs to be updated. The length of time may be represented to an actual clock time, a time from which the content item was first served, and/or a number of refresh or update requests that are received after the content item was first served. Within a web page, this cache time parameter may be set to different values for different variable elements, or different cache time parameters may apply to different variable elements. Alternatively, one value could apply to all of the page's variable elements. For caching purposes, neither a browser nor a content delivery network can predict, without a hint, whether the data server will serve the same data repeatedly. Applying a cache time parameter creates a new possibility of caching data for variable elements of a web page, beyond caching whole static pages.

The caching activities of an edge server 125 can be extended when cache time parameters are applied to individual variable elements. The edge server can use a cache time parameter applied to a variable element, instead of the entire page, to determine how often a data server will update or change the values that it sends in response to a particular request. For example, if a cache time parameter specifies a one hour time period, then the edge caching server may cache content responsive to a the parameter's corresponding variable element for up to one hour. During that one-hour period, the edge server may respond to requests for that same content from its cache, instead of requesting refreshed data from the data server. This speeds the delivery of requested content.

Another type of speed-up parameter is a criticality hint. A criticality hint is code that specifies a number of data elements should be made available for immediate display in a first returned set of data. This enables a data server to send a limited amount of data in response to a data request. For example, a criticality hint may specify that the first 5 content elements should be returned and displayed first, before any other content elements are retrieved. Among other places, criticality hints may be useful in a content delivery network that uses edge caching servers.

The number of data elements returned by a data server can be limited when a criticality hint is applied to a variable element that requests data from a server. One implementation of the criticality hint is "critical=N", where "N" is a lower bound on the number of data elements considered critical for retrieval in a first set of data. It may be useful to match "N" to the number of data elements that will initially be visible to a user. Then, the data server (or a caching device in the browser or caching server) is encouraged to return N data elements immediately in a first data set and take additional time to compile additional elements for delayed delivery in a second data set. Since the number of data elements initially visible will depend on a user's display, N may be specified relative to reference display format and adjusted as necessary. A reasonably low criticality hint value reduces the latency due to initial retrieval of a first data set from a data server. Such a criticality hint may interact synergistically with a cache time hint. Either the edge caching server or a caching enabled browser may consume and respond to a cache time parameter. In contrast, a data server is the primary consumer of a criticality hint.

The speed-up parameters described above may be contained in within the code of a web page, within a header such as a hypertext transfer protocol (HTTP) header, metadata or a file that accompanies the web page.

Combining the speed-up parameters, a critical number of data elements may be available in a cache sooner than it can be supplied by a data server. Sometimes, both cache time parameters and criticality hints may apply to the same variable element. When an edge caching server encounters a data request for cacheable data, it looks in the available cache. If it finds valid cached data elements responsive to the data request, it returns those data elements immediately as a first data set. It can modify the data request and pass a modified data request to the data server, or it can caches its response to the request, forwards the request, and filters the data server's response based on the cached data elements that it already supplied. More generally, when both cache time parameters and criticality hints apply to the same variable element, an edge caching server may determine the extent to which immediate needs for data can be satisfied from cache, as an alternative to or preemptively supplying data that otherwise would await a response from a data server.

A handful of code fragments illustrate one implementation of these hints. In general, properties of a variable element of a web page can be specified using special attributes, as illustrated by the following code fragment of a template:

```
<xb12:template  id="section"  data-bind-id="section"
    style="display:none; text-align:center;">
  <img       id="image_id"       xb12:src="{{src}}"
      alt="smiley">
  <br/><span>{{textId}}</span>
  <br/><a              id="anchor              id"
      href="#data={{action}}">{{action}}</a></xb12:
      template>
```

In the code above, attributes of style for "section" include "display:none" and "text-align:center." These attributes apply throughout this short template. Double curly brackets identify a variable, such as a JSON variable. At run time, the browser may substitute content from a data source for the variable.

In some embodiments, speed-up parameters may be positioned as language extensions among other attributes such as style. Examples of positioning of speed-up parameters are illustrated in the following examples. The following two examples illustrate the hints "cache time parameter" and "criticality hint." The cache time parameter specifies a period in which refreshing of data is not necessary if a prior copy of the data has been locally cached. An example, which adds the attribute cache, follows:

```
<xb12:template   id="section"   data-bind-id="section"
    cache="1   hour"   style="display:none;   text-align:
    center;">
  <img            id="image_id"            xb12:
      src="{{src}}"alt="smiley">
  <br/><span>{{textId}}<span>
  <br/><a              id="anchor              id"
      href="#data={{action}}">{{action}}</a></xb12:
      template>
```

The "cache" attribute is the cache time parameter includes a code that indicates how long cached variable data can be considered valid and can be used to render a page without being refreshed. The code may be as literal as "1 hour," or a less literal code can be used. In this context, we mean "variable data" in a sense specified by a web page designer or a tool used by a web page designer, as opposed to page layout that applies to the formatting of variable data, regardless of values taken on by the variable data element. Separating data from layout is a cornerstone of dynamic HTML (DHTML). The disclosed cache time parameter applies to a particular variable data element, specified by the "image id" attribute, as opposed to layout tags or static content.

In contrast to a cache-control parameter in an HTTP header, this cache time parameter is meant to apply at an element level, instead of a web page level. On a web page that does not have a cache-control parameter, the disclosed cache time parameter can be applied to particular variable elements, encouraging browsers, proxies, gateways and edge caching sewers to cache the variable elements if they are frequently requested. In addition, the cache time parameter may enable caching of variable elements that might not otherwise be considered cacheable. This cache time parameter can usefully be combined with a criticality hint.

The criticality hint is a retrieval hint that can be relayed to a data server or similar data source to indicate what data is considered critical to an initially visible portion of a web page, to establish a priority on some data delivery. For instance, a criticality hint may indicate, directly or indirectly, how much data will be visible when a web page is initially rendered. The data initially rendered in response to the criticality hint can be delivered sooner than additional data. An example, which adds the attribute "critical" to provide the criticality hint, follows:

```
<xb12:template id="section" data-bind-id="section" criti-
    cal="3" style="display:none; text-align: center;">
  <img       id="image_id"       xb12:src="{{src}}"
      alt="smiley">
  <br/><span>{{textId}}</span>
  <br/><a              id="anchor              id"
      href="#data={{action}}">{{action}}</a></xb12:
      template>
```

The attribute "critical" may include a code that either indicates a degree of criticality or how much retrieved data will be immediately visible when the web page is displayed. A data sewer that supports and understands this attribute can partition its delivery of data to a first data set for immediate display and a second, delayed data set for later display. The data in the first data set should be enough to satisfy the need for above the fold data to display immediately. The data in the second data set can be delivered later, while a user is perusing a display of data from the first data set. The code may be as literal as specifying the quantity of data instances that are critical for initial display. Or, it can be a code tied to a standard display format, a code that a web browser modifies before sending it to a data server. The amount of screen real estate available differs greatly from device to device and even among instances of browser windows open on a particular device. Accordingly, it is anticipated that the web browser may either supply display size information to a web site and receive a properly sized "critical" parameter or the web browser may need to revise the value of the critical parameter to take into account an intended display window. The criticality hint may enable a web browser to provide information to a data server in a manner that reduces latency by reducing the amount of data initially returned and allowing additional, non-critical data t0 be delayed.

Figure 2:
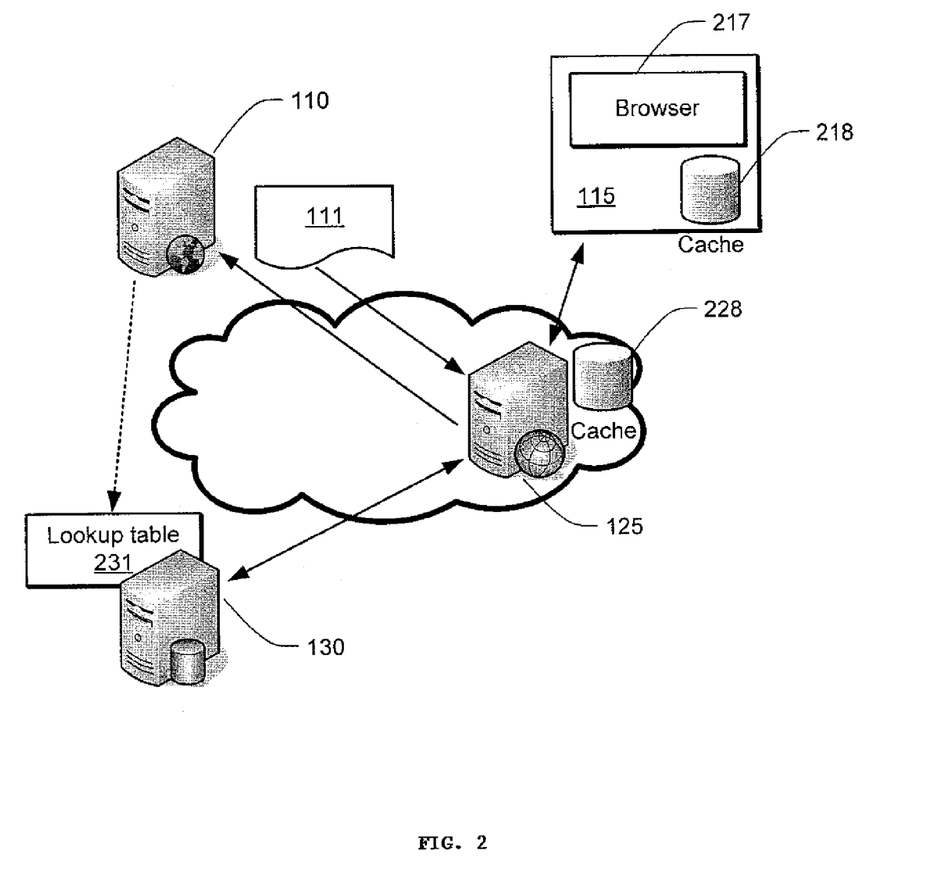
FIG. 2 is an example of a client and server architecture modified to support retrieval hints.

FIG. 2 is an example of a client and server architecture modified to support speed-up parameters. The client system 115 is illustrated with greater detail than in FIG. 1, to show the browser or other client application 217 running on the client system and an optional data cache 218 that could be used to implement a cache time parameter. Not illustrated is a proxy server between the client system and the edge server, where a data cache could alternatively be positioned. The edge server 125 also is illustrated as having a data cache 228. The data server 130 is illustrated as having a lookup table 231 in which the system may look up retrieval hints or other speed-up parameters upon receipt of data requests, in implementations where the edge server 125 does not pass hints to the data server 130. Alternatively, the lookup table 231 could be positioned at the edge server 125 and the edge server could append one or more hints to a data request sent to the data server. When the lookup table 231 is positioned at the data server, it may be populated with request and hint pairs directly from the web server 110. Alternatively, if the lookup table 231 is positioned at the edge server, it can be populated dynamically, when a web page 111 with a hint passes through the edge server on the way to the client system 115. Or, a lookup table 231 positioned at the edge server could be populated directly by the web server 110. Use of this architecture can be illustrated by the process flow diagrams of FIGS. 3-6.

Figure 3:
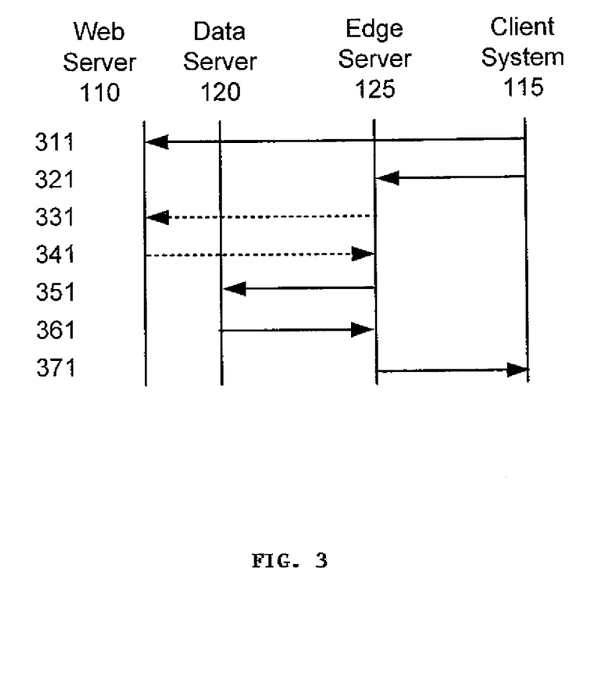
FIG. 3 illustrates a basic message flow without hints.

A basic process flow without hints or other speed-up parameters is illustrated in FIG. 3. Users may naïvely expect their requests to go directly 311 from a client system 115 to a web server 110. High traffic web sites often are designed to take advantage of a content delivery network with edge servers 125 strategically positioned with low latency relative to client systems 115 to respond to requests and to reduce the frequency of requests sent all of the way to the web server 110. The edge server 125 looks to see if it has a responsive cacheable web page in its cache and avoids the round trip 331, 341 from the edge server 125 to the web server 110 if it has the requested page in its is cache. The edge server 125 responds 371 to a request with reduced latency, using the cached static page. On the other hand, requests for variable elements appear on web pages that are not marked cacheable in the HTTP header, because the data returned by the data server 120 changes. For instance, if the requested web page involves the sale of concert tickets or the pricing of airline tickets, the availability and/or price may be updated continuously at the data server. In FIG. 3, a request for a variable element of the web page 321 from the client system results in a round trip 351, 361 to obtain and return 371 to the client the requested data.

Figure 4:
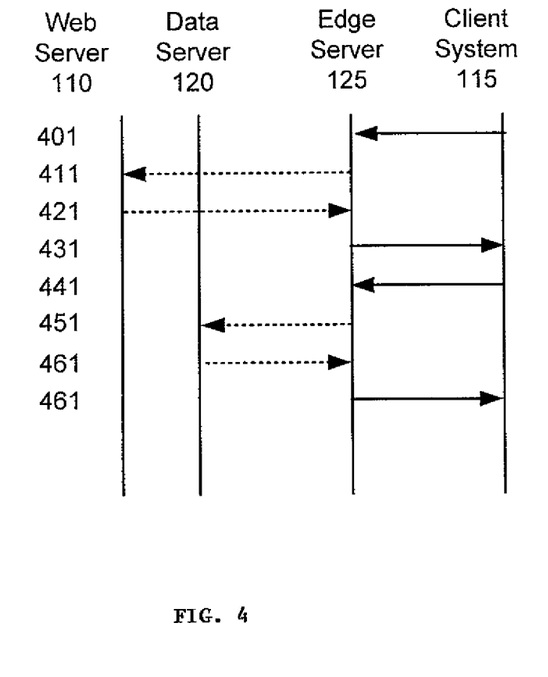
FIG. 4 provides an example of a message flow in an architecture that supports cache hints or cache time parameters.

FIG. 4 provides an example of a process flow in an architecture that supports speed-up parameters. Consider first the implementation of caching hints using a data cache 228 positioned at the edge server 125. The client system 125 requests 401 a web page. Depending on whether the edge server has the page in cache, the request 401 may result in a round trip 411, 421 to retrieve the requested page from the web server 110. The requested web page 111 is returned 431 to the client system 115, either from the edge server's cache or as a result of the round trip to the web server 110.

After the initial delivery of the web page is completed, when the client makes and the edge server receives a request 441 to refresh or update the page, the edge server may return only certain variable elements of the web page, such as illustrated by template code fragments above. It may do this by determining whether or not the page includes a retrieval hint. If the page does not include a retrieval hint, then the system may presume that the web page has no variable content, and it may return the web page in accordance with any process of the prior art. However, if the page includes a retrieval hint, then it may use the retrieval hint to identify the page's variable content and follow the process described below to determine whether or not to update each variable content item.

In this message flow, the edge server 125 includes a data cache. If the web page includes a retrieval hint indicating that certain content items are cacheable and others are not, in one implementation, the edge server has stored the cache time parameter (or parameters) for the web page's variable content in a lookup table 231 that is accessible by the edge server. Options for storing this parameter include those described above as capture when a web page is forwarded to a client system or as a result of parameter distribution by the web server directly to its content delivery network (CDN). In another implementation, the browser passes the cache time parameter to the edge server 125 with the data request 441.

However the edge server learns the cache time parameter for a particular data request, it uses the time value specified to look for an unexpired copy of the requested data. The round trip 451, 461 request to the data server 120 can be avoided if unexpired data responsive to the variable element is available in cache 228. The requested data is returned 471 to the client system. Data caching, responsive to variable elements, is enabled by assigning a time cache parameter on an element-by-element basis to variable elements of the web page. Latency may be reduced when the edge server finds a hit in its data cache.

The edge server optionally can update its cache when it passes a web page 111 from the web server 110 to the client system 115. At this point, it can be anticipated that the browser will parse the web page and request data for variable elements of the web page. The edge server can update its cache by requesting data that it expects the browser to request. This potentially reduces latency because fulfilling data requests begins before the data requests are made and may result in the cache having the requested data at the time the data request is received.

In an alternative flow involving a browser connected data cache, the data request 441 to the edge server can be avoided if the browser finds a hit in its data cache. Similarly, if a proxy server is present between the browser and edge server (not illustrated), a data request 441 can be served by the proxy server without forwarding the data request to the edge server 125 or data server 120. The cacheability parameter needs to reach the proxy server and be acted upon by the proxy server. It can reach the proxy server on the initial delivery of the web page to the client system, when the client system makes a data request to satisfy a variable element of the web page, or by direct communication between the proxy server and the web server.

Thus, based on the speed-up parameters, the edge server may serve, or the browser may retrieve, the variable content without updating the static content. For example, the variable content may be retrieved from a local cache if the cache time parameter has not expired, or if the variable content is an element that is included within a set of elements that are covered by a criticality hint. As used in this document, the phrase "without updating the static content" does not mean that the static content is never updated, but rather it means that the static content remains static at least some of the time, or most of the time, that the variable content is updated.

In some network implementations, the edge server caches and/or browser connected data cache (see 218, 228 in FIG. 2) might be present in multiple positions. Data requests might be checked against data caches maintained by at the client system 115, a proxy server or an edge server 125 for data responsive to variable elements. A hit in any of these caches could avoid a round trip 451, 461 to the data server. In any of these architectures, caching of data responsive to variable elements is enabled by assigning a time cache parameter on an element-by-element basis.

Figure 5:
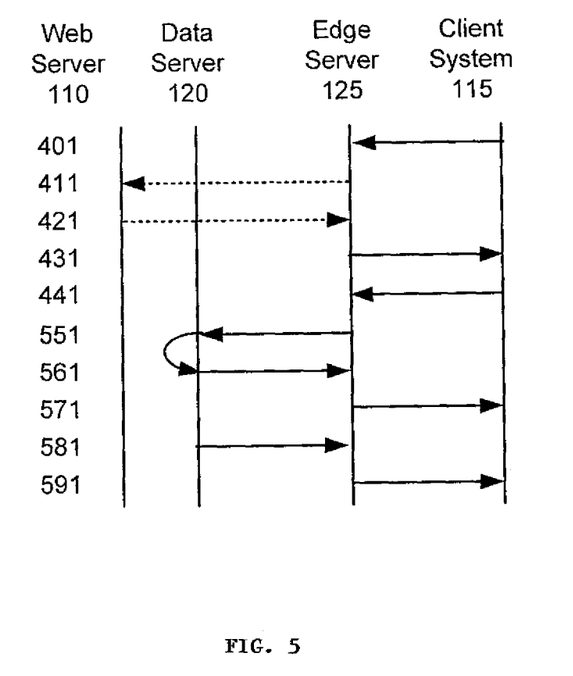
FIG. 5 provides an example of a message flow in an architecture that supports criticality hints.

FIG. 5 provides an example of a message flow in an architecture that supports criticality hints. Consider first the implementation of criticality hints using a lookup table that is accessible by the data server 130. The first few steps of this flow (401-441) repeat the flow of FIG. 4. At step 551, the edge server sends a data request to data server 120. If the data request is not accompanied by the criticality hint, the data server 120 checks its lookup table to see what criticality hint applies to this request. Something in the data request may be interpreted as a key to the lookup table. Alternatively, the criticality hint accompanies the data request. The data server receives the criticality hint and uses its value to identify how may data elements are considered critical for initial display. It returns a first data set 561 at a first time with less latency because fewer data elements need to be obtained in response to the request. The first data set is forwarded 571 from the edge server to the client system. The data server 120 continues to provide data in a second data set 581, which is again forwarded 591 to the client system. This data may be provided without a further request from the client system, when the data becomes available, or it may not be provided until the client system signals that a user has navigated on the client system to make more data visible than initially specified as critical. A combination of sending a second data set and waiting for client navigation before retrieving and sending a third data set also can be useful.

As discussed in the context of FIG. 4, the lookup table for a criticality hint could alternatively be accessible by the edge server 125. Or, a criticality hint could be passed from the client system through the edge server to the data server without intermediate lookup tables.

Figure 6:
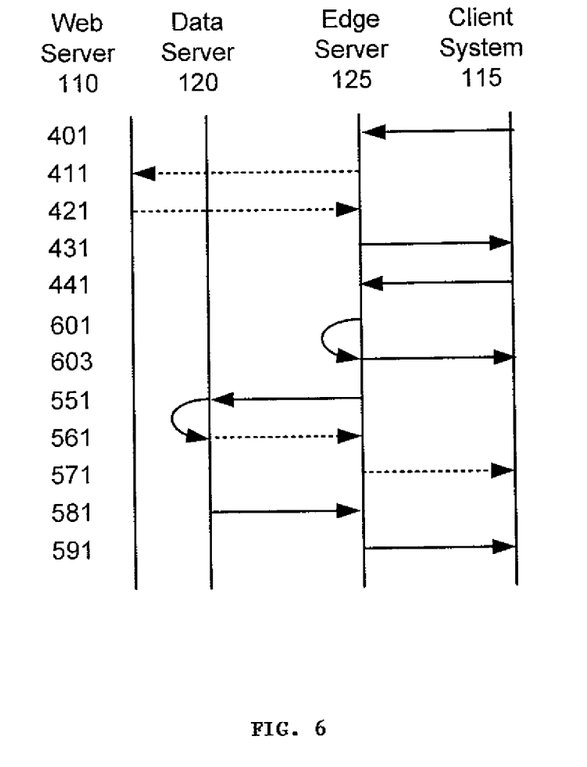
FIG. 6 is an example of processing both cache and criticality hints applied to a single data request generated from a variable element of a web page.

FIG. 6 is an example of a process that applies both cache time parameters and criticality hints applied to a single data request generated from a variable element of a web page. Nearly all of the messages generated are the same as in FIGS. 4-5. An additional possibility arises in which the edge server 125 responds with data elements that supplant return of the first data set 561, 571 or reduce the number of data elements needed for a first data set. The client system 115 may receive enough data elements to satisfy the criticality hint from the edge server's cache or from a combination of the edge server's cache and a first data set provided by the data server 120. When this occurs, the edge server 125 may forward cached data immediately, resulting in a greater reduction in latency, or it may combine data in its cache with a smaller first data set from the data server, resulting in less reduction in latency. The edge cache's determination of whether to forward cached data immediately may depend on the amount of data available in cache in comparison to or as a fraction of the number of data elements specified by the criticality hint. Returning too little data could degrade a user experience and might be avoided in some implementations.

Not illustrated is the mechanism by which the edge server handles reducing or filtering the data returned by the data server when the cache hits. The edge server may request all of the responsive data from the data server and filter data returned in the second data set to avoid duplication of data elements returned from cache. Alternatively, the edge server may send a parameter to the data server that either specifies the number of data elements already returned or identifies the data elements already returned. As a third alternative, the edge server could send all of the data elements received from the data server to the client system and rely on the client system to resolve any duplication.

The technology disclosed may be practiced as a method or device adapted to practice the method. The methods can be viewed from the perspective of a web page server, an edge server, a client system or a data server. The technology may be an article of manufacture such as non-transitory storage loaded with program instructions to carry out computer-assisted processing of web pages with retrieval hints and other speed-up parameters, that, when loaded onto appropriate hardware, enables the hardware to carry out the any of the methods practiced by a web page server, an edge server, a client system or a data server. Similarly, technology may be an article of manufacture such as non-transitory storage loaded with program instructions that, when loaded onto appropriate hardware, produces any of the web page server, edge server, client system or data server devices.

One implementation may include a method of enabling acceleration of web page delivery that includes, in response to a request to deliver a web page, sending a mark-up page having one or more time varying elements, including at least one speed-up parameter applied to a particular time varying element, wherein the speed-up parameter specifies a hint applied to the particular time varying element and useable to reduce latency in data retrieval when retrieving data responsive to the particular time varying element.

Practicing this method, one or more speed-up parameters applied to the variable content element may be include a cache time parameter and/or a criticality hint. The cache time parameter, when applied, may indicate how long a cached copy of data responsive to the time varying element can be used without requesting a new copy of the data. The criticality hint, when applied, may indicate how many data elements returned by a data source responsive to the particular time varying element would be visible immediately upon rendering of the web page. The criticality hint alternatively may be defined to indicate how many data elements returned by a data source responsive to the particular element should be used in initial rendering of the web page. This alternative definition may be combined with any of the particular implementations described above or in the following sections that precede the claims.

The technology disclosed also may be practiced in edge servers and the like. A method of accelerating web page delivery, from the edge server perspective, may include receiving, in response to a client system-initiated request for a web page, a particular web page that includes static and variable content elements. In the web page, at least one particular variable content element may be associated with at least one speed-up parameter that specifies a hint applied to the particular variable content element and useable to reduce latency in data retrieval when retrieving data responsive to the particular variable content element. The edge server may forward at least part of the particular web page to the client system. It may send less than the whole web page when, for instance, it updates the variable content but does not update certain content that it identifies as static content based on retrieval hints.

In some implementations, the method also may include receiving from the client system a particular data request corresponding to the particular element, then locating and returning a cached copy of the particular time varying element for the web page that was cached within a time indicated by the associated cache time parameter.

When the retrieval hint received is a criticality hint, the method may further include, after forwarding the particular web page to the client system, receiving from the client system a particular data request corresponding to the particular time varying element and sending a data server the particular data request. The method further includes receiving from the data server a first set of data elements that satisfy the criticality hint and forwarding the first set of data elements to the client system. At a later time delayed from receipt of the first set of data elements, the method includes receiving from the data server a second set of data elements that cumulatively exceed a number of data elements set by the criticality hint and forwarding the second set of data elements to the client system.

The technology described further includes methods practiced by or from the perspective of a client system or a browser or other client module running on a client system. From this perspective, a method of accelerating web page delivery may include receiving, in response to a client system-initiated request for a web page, a particular web page that includes static content elements and variable content elements. This page may be received from a data server, an edge server or a proxy server. The client system is agnostic to what server actually responds to the request for the web page. At least one particular variable content element may be associated with at least one speed-up parameter that specifies a hint applied to the particular time varying element and useable to reduce latency in data retrieval when retrieving data responsive to the particular time varying element. In some implementations, the speed-up parameter may be processed by one or more intermediate devices and does not actually reach the client system. The method also may include requesting data responsive to the particular time varying element that was marked with the speed-up parameter, receiving the data responsive to the particular variable content element and using it to render the web page. In this context and throughout this document, "render" has a meaning of submitting the page to a display subsystem for graphic display. It is not meant to include driving a display or the actual display of the web page. The method may be extended to include both rendering and displaying the web page, but this is not essential to any of the methods described.

In some implementations, the method further includes requesting data responsive to the particular time varying element from a local cache and receiving from the local cache at least some data responsive to the particular time varying element that was cached within a time indicated by the cache time parameter. It further includes rendering the web page, using at least data received from the local cache in combination with other elements of the web page.

The local cache is located on the client system or between the client system and a wide area network such as the Internet. Accordingly, the method may include directing the request for data responsive to the particular time varying element to a module on a local machine that maintains the local cache or directing it to a proxy server positioned between the client system and a wide area network.

A fourth perspective of accelerating web page delivery is that for the data server. This method may include receiving a criticality hint for a particular variable content element of a particular web page that includes static and variable content elements. Again, the alternative definition of criticality hint given above applies to this perspective. The method also may include receiving a particular data request corresponding to the particular variable content element, returning a first set of data elements that satisfy the criticality hint, and returning, at a time delayed from returning the first set of data elements, a second set of data elements that cumulatively exceed a number of data elements set by the criticality hint.

The criticality hint may be available to the data server in alternative ways. The criticality hint may be received prior to receiving the particular data request and stored in a lookup table. In this implementation, the method further includes matching the particular data request through the lookup table to the criticality hint. Alternatively, the criticality hint may be received with the particular data request.

The technology in the methods described above from the perspectives of a web server, an edge server, client system and data server can be practiced as an apparatus. In practice, the web server methods may be implemented on a web server apparatus that includes one or more processors and memories (collectively "hardware"), running computer instructions that cause the web server to carry out any of the web server methods described. The edge server methods may be implemented as an edge server that includes hardware running computer instructions that cause the edge server to carry out any of the edge server methods described. The client system methods may be implemented as an client system that includes hardware running computer instructions that cause the client system to carry out any of the client system methods described. The same applies to the data server methods and data servers.

The technology in the methods described above from the four perspectives of a web server, an edge server, client system and data server can be practiced as an article of manufacture that includes computer instructions in non-transitory storage. The computer instructions may carry out computer-assisted processing of web pages with retrieval hits, that, when loaded onto appropriate hardware, enables the hardware to carry out the any of the described methods practiced by a web page server, an edge server, a client system or a data server. Similarly, technology may be non-transitory storage loaded with program instructions that, when loaded onto appropriate hardware, produces any of the web page server, edge server, client system or data server devices described above.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of web page delivery, the method comprising:
   receiving, by a first server, a request to deliver a web page to a client;
   identifying, by the first server, code corresponding to the web page, wherein the web page comprises a plurality of static content elements and a variable content element, wherein the variable content element is a content item that is to be updated each time the web page is served;
   receiving, at the first server, speed up parameter data, wherein the speed up parameter data comprises time data specifying a length of time that a server may cache content responsive to the variable content element specified by the speed up parameter data so that the variable content element is not updated each time the web page is served;
   serving, by the first server, the web page so that the web page comprises the static content elements and the variable content element;
   receiving, from the client, additional requests for the web page, and for each additional request, determining, based on the length of time for the variable content element, whether the length of time has been exceeded;
   storing, in a cache at the first server, the static content elements and the variable content element;
   in response to determining, for a first additional request, that the length of time has not been exceeded:
      serving, by the first server and from the cache, the web page including the static content elements and the variable content element;
   in response to determining, for at least a second additional request after the first additional request, that the length of time has been exceeded:
      retrieving only the updated data corresponding to the variable content element from a second server; and
      serving, by the first server, the web page including the updated data corresponding to the particular variable content element and the static content elements, without updating the static content elements.

2. The method of claim 1, wherein:
   the web page comprises a plurality of additional variable content elements;
   the speed-up parameter comprises a criticality hint having a numeric value; and
   serving the web page also comprises:
   initially retrieving, from the second server, a number of the variable content elements;
   initially serving the web page so that it includes the initially retrieved variable content elements;
   subsequently retrieving, from the second server, any remaining variable content elements that exceed the number; and subsequently serving the web page so that it includes the initially retrieved variable content elements and the subsequently retrieved variable content elements.

3. The method of claim 1, wherein:
the web page comprises a plurality of additional variable content elements;
the speed-up parameter comprises a criticality hint having a numeric value; and
the serving also comprises serving a number of the variable content elements that corresponds to the numeric value of the criticality hint before retrieving and serving any more of the additional variable content elements.

4. The method of claim 1, wherein:
the web page comprises a plurality of additional variable content elements;
the speed-up parameter comprises a criticality hint having a numeric value;
serving the updated data also comprises:
initially retrieving, from the second server, a number of the variable content elements, wherein the number corresponds to the numeric value,
initially serving the web page so that it includes the initially retrieved variable content elements,
after the initially serving, subsequently retrieving, from the second server, any remaining variable content elements that exceed the number, and
subsequently serving the web page so that it includes the initially retrieved variable content elements and the subsequently retrieved variable content elements.

5. The method of claim 1, wherein:
the web page comprises a plurality of additional variable content elements;
the speed-up parameter comprises each of a criticality hint and a cache time parameter;
serving the web page also comprises:
initially retrieving, from the second server, a number of the variable content elements, wherein the number corresponds to a numeric value of the criticality hint,
initially serving the web page so that it includes the initially retrieved variable content elements,
after the initially serving, subsequently retrieving, from the second server, any remaining variable content elements that exceed the number, and
subsequently serving the web page so that it includes the initially retrieved variable content elements and the subsequently retrieved variable content elements; and
the method further comprises:
by the first server, determining whether a period corresponding to the cache time parameter has expired, and only retrieving the updated data from the second server if the period has expired, otherwise retrieving the updated data from a local cache.

6. The method of claim 1, wherein:
the web page comprises a plurality of additional variable content elements;
the speed-up parameter comprises a criticality hint and a cache time parameter;
the method further comprises:
by the first server, determining whether a period corresponding to the cache time parameter has expired, and only retrieving the updated data from the second server if the period has expired, otherwise retrieving the updated data from a local cache; and
serving the updated data also comprises serving a number of the variable content elements that corresponds to a numeric value of the criticality hint before retrieving updated data from the second server for any more of the additional variable content elements.

7. A method of web page delivery, the method comprising:
receiving, by a first server, a request to deliver a web page to a client;
determining, by the first server, that a retrieval hint is available for the web page;
using by the first server, the retrieval hint to identify at least one static content element and a variable content element for the web page, wherein the variable content element is a content item that is to be updated each time the web page is served;
receiving, at the first server, speed up parameter data, wherein the speed up parameter data comprises time data specifying a length of time that a server may cache content responsive to a variable content element specified by the speed up parameter data so that the variable content element is not updated each time the web page is served;
serving, by the first server, the web page so that the web page comprises the static content elements and the variable content element;
storing, in a cache at the first server, the static content elements and the variable content element;
receiving, by the first server, additional requests from the client to update the web page;
determining, by the first server, that a speed-up parameter is available;
for each additional request, determining, based on the length of time for the variable content element, whether the length of time has been exceeded;
in response to determining, for a first additional request, that the length of time has not been exceeded:
serving, by the first server and from the cache, the web page including the static content elements and the variable content element;
in response to determining, for a second additional request after the first additional request, that the length of time has been exceeded:
retrieving only the updated data corresponding to the variable content element from a second server; and
serving, by the first server, the web page including the updated data corresponding to the variable content element and the static content elements, without updating the static content elements.

8. The method of claim 7, wherein:
the web page comprises a plurality of additional variable content elements;
the speed-up parameter comprises a criticality hint having a numeric value; and
serving the web page also comprises:
initially retrieving, from the second server, a number of the variable content elements;
initially serving the web page so that it includes the initially retrieved variable content elements;
subsequently retrieving, from the second server, any remaining variable content elements that exceed the number; and
subsequently serving the web page so that it includes the initially retrieved variable content elements and the subsequently retrieved variable content elements.

9. The method of claim 7, wherein:
the web page comprises a plurality of additional variable content elements;
the speed-up parameter comprises a criticality hint having a numeric value; and the serving also comprises serving a number of the variable content elements that corresponds to the numeric value of the criticality hint before retrieving and serving any more of the additional variable content elements.

10. The method of claim 7, wherein:
the web page comprises a plurality of additional variable content elements;
the speed-up parameter comprises a criticality hint having a numeric value;
serving the updated data also comprises:
initially retrieving, from the second server, a number of the variable content elements, wherein the number corresponds to the numeric value,
initially serving the web page so that it includes the initially retrieved variable content elements,
after the initially serving, subsequently retrieving, from the second server, any remaining variable content elements that exceed the number, and
subsequently serving the web page so that it includes the initially retrieved variable content elements and the subsequently retrieved variable content elements.

11. The method of claim 7, wherein:
the web page comprises a plurality of additional variable content elements;
the speed-up parameter comprises a criticality hint and a cache time parameter;
serving the web page also comprises:
initially retrieving, from the second server, a number of the variable content elements, wherein the number corresponds to a numeric value of the criticality hint,
initially serving the web page so that it includes the initially retrieved variable content elements,
after the initially serving, subsequently retrieving, from the second server, any remaining variable content elements that exceed the number, and
subsequently serving the web page so that it includes the initially retrieved variable content elements and the subsequently retrieved variable content elements; and
the method further comprises:
by the first server, determining whether a period corresponding to the cache time parameter has expired, and
only retrieving the updated data from the second server if the period has expired, otherwise retrieving the updated data from a local cache.

12. The method of claim 7:
further comprising before the determining, storing the speed-up parameter in a look-up table by the first server; and
wherein the determining comprises accessing the look-up table to retrieve the speed-up parameter.

13. A system comprising:
a local server having a processor, one or more communication ports that are in communication via a network with a remote server and a client device, and a memory containing programming instructions that, when executed, are configured to instruct the processor to:
receive a request to deliver a web page to a client;
identify code corresponding to the web page, wherein the web page comprises a plurality of static content elements and a variable content element, and the code comprises a speed-up parameter corresponding to the variable content element, wherein the variable content element is a content item that is to be updated each time the web page is served;
receive speed up parameter data, wherein the speed up parameter data comprises time data specifying a length of time that a server may cache content responsive to a variable content element specified by the speed up parameter data so that the variable content element is not updated each time the web page is served;
serve, to the client device, the web page so that the web page comprises the static content elements and the variable content element;
store, in a cache at the first server, the static content elements and the one or more variable content elements
receive, from the client, additional requests for the web page, and for each additional request, determine, based on the length of time for the variable content element, whether the length of time has been exceeded;
in response to determining, for a first additional request, that the length of time has not been exceeded:
serve, by the first server and from the cache, the web page including the static content elements and the variable content element;
in response to determining for a second additional request after the first additional request that the length of time has been exceeded:
retrieve only the updated data corresponding to the variable content element from a second server; and
serve, to the client device, the web page including updated data corresponding to the variable content element and the static content elements, without updating the static content elements.

14. The system of claim 13, wherein:
the web page comprises a plurality of additional variable content elements;
the speed-up parameter comprises a criticality hint having a numeric value; and
the programming instructions that, when executed, are configured to instruct the processor to cause the processor to serve the updated data comprise instructions to:
initially retrieve, from the remote server, a number of the variable content elements, wherein the number corresponds to the numeric value of the criticality hint;
initially serve the updated data to the client device so that it includes the initially retrieved variable content elements;
subsequently retrieve, from the remote server, any remaining variable content elements that exceed the number; and
serve the updated to the client device so that it includes the initially retrieved variable content elements and the subsequently retrieved variable content elements.

15. The system of claim 13, wherein:
the web page comprises a plurality of additional variable content elements;
the speed-up parameter comprises a criticality hint having a numeric value; and
the programming instructions that, when executed, are configured to instruct the processor to serve the web page comprise instructions to serve a number of the variable content elements that corresponds to the numeric value of the criticality hint before retrieving and serving updated data for any more of the additional variable content elements.

16. The system of claim 13, wherein:
the web page comprises a plurality of additional variable content elements;
the first server also comprises a local cache;
the speed-up parameter comprises a criticality hint and a cache time parameter;

the programming instructions that, when executed, are configured to instruct the processor to serve the web page comprise instructions to:

initially retrieve, from the remote server, a number of the variable content elements, wherein the number corresponds to a numeric value of the criticality hint, initially serve the web page so that it includes the initially retrieved variable content elements, after the initially serving, subsequently retrieve, from the remote server, any remaining variable content elements that exceed the number, and subsequently serve the web page so that it includes the initially retrieved variable content elements and the subsequently retrieved variable content elements; and the programming instructions further include instructions that, when executed, are configured to instruct the processor to:

determine whether a period corresponding to the cache time parameter has expired, and only retrieve the updated data from the remote server if the period has expired, otherwise retrieving the updated data from the local cache.

17. The system of claim 13, wherein:

the web page comprises a plurality of additional variable content elements;

the first server also comprises a local cache;

the speed-up parameter comprises a criticality hint and a cache time parameter;

the programming instructions further include instructions that, when executed, are configured to instruct the processor to:

determine whether a period corresponding to the cache time parameter has expired, and only retrieve the updated data from the remote server if the period has expired, otherwise retrieving the updated data from the local cache; and the programming instructions that, when executed, are configured to instruct the processor to serve the updated data comprise instructions to serve a number of the variable content elements that corresponds to a numeric value of the criticality hint before retrieving updated data from the second server for any more of the additional variable content elements.

* * * * *